United States Patent [19]

Novak

[11] 3,784,736

[45] Jan. 8, 1974

[54] METHOD AND APPARATUS FOR CONVERTING MONOCHROME PICTURES TO MULTI-COLOR PICTURES ELECTRONICALLY

[76] Inventor: Joseph F. Novak, 447 Ridge Ct., Roselle, Ill.

[22] Filed: Oct. 26, 1972

[21] Appl. No.: 300,972

Related U.S. Application Data

[63] Continuation-in-part of Ser. No. 181,425, Sept. 17, 1971, Pat. No. 3,706,841.

[52] U.S. Cl. ..... 178/5.4 R, 178/5.2 R, 178/5.4 CD, 178/6.6 A

[51] Int. Cl. .......... H04n 9/02

[58] Field of Search .......... 178/5.2 R, 5.4 R

[56] References Cited

UNITED STATES PATENTS 3,706,841 12/1972 Novak .......... 178/5.4 R

*Primary Examiner*—Robert L. Richardson
*Attorney*—Jack E. Dominik et al.

[57] ABSTRACT

This invention relates to improved methods and apparatus for the conversion of black and white or monochrome pictures to retouched black and white pictures, multicolor video pictures and multicolor film pictures, using high speed and large capacity storage memory units.

8 Claims, 1 Drawing Figure

PATENTED JAN 8 1974

3,784,736

METHOD AND APPARATUS FOR CONVERTING MONOCHROME PICTURES TO MULTI-COLOR PICTURES ELECTRONICALLY

CROSS-REFERENCES TO RELATED APPLICATIONS

This application is a continuation-in-part of U.S. Pat. application, Ser. No. 181,425, filed Sept. 17, 1971 now U.S. Pat. No. 3,706,841, issued Dec. 19, 1972.

BACKGROUND OF THE INVENTION

This invention relates to improved methods and apparatus for the conversion of black and white or monochrome pictures to retouched black and white pictures, multicolor video pictures and multicolor film pictures. More particularly, the invention relates to improved methods and apparatus for performing these conversions electronically.

In U.S. Pat. application, Ser. No. 131,758, filed Apr. 6, 1971, now abandoned, by the present applicant, there is disclosed a method of converting black and white or monochrome originals to multicolor pictures including the steps of projecting the image of the black and white film onto a rear projection screen, applying color to the image and thereafter photographing the image on color film so as to obtain a film containing color detail. The method is primarily or particularly directed to converting existing black and white or monochrome originals to ones of multicolor.

In the above-mentioned U.S. Pat. No. 3,706,841, there is disclosed a method and apparatus whereby this can be accomplished electronically, using three principal components or pieces of equipment, namely: a color video tape recorder playback unit, a black and white video camera, and a color monitor. Basically, a black and white image is picked up by the black and white video camera and displayed on the color monitor. A video tape is produced, using the color video tape recorder-playback unit, with color signals that correspond to the area of the black and white image to be colored. The output signals of the black and white video camera and the video tape recorder-playback unit are combined to form a color picture on the color monitor, using the varying signal voltages of the black and white video camera to control the amount of color displayed on the color monitor. Where total black appears on the black and white picture, no color appears on the color monitor. Conversely, where no black appears on the black and white picture, the full color brilliance appears on the color monitor. Varying shades of black control the amounts of color to be displayed thus producing a colored picture with varying shades of color and also black and white at the extreme ranges of the color spectrum. The color picture displayed on the color monitor then can be either photographed on film or recorded on video tape.

The resolution capabilities of the various components of the system are dependent upon the final format of the pictures. In particular, where the normal vertical scanning rate of television or video systems in the United States is 525 lines, this is satisfactory for color video tapes. A much higher scanning rate is preferred for producing color films to be used for projection purposes.

SUMMARY OF THE INVENTION

In accordance with the present invention, black and white pictures can be retouched prior to being converted to color video tapes, or to color negatives or positive transparencies, by using high speed and large capacity storage memory units providing a foreground memory and a background memory, in place of using video tape for storage of information.

Generally, in this case, the output of the video camera is coupled to and conditioned by video output unit for processing by an analog-to-digital converter. The latter then couples the signals to a buffer register which places them in a main memory storage. In this way, pictures can be reconstructed on a black and white video monitor either as originally recorded or as reconstructed pictures that have been retouched. The process of retouching is accomplished by modifying the electrical signals stored in the memory.

If color is to be added, color signals can be stored in a foreground memory and a background memory, with the output of the video camera being stored in the main portion of the memory. The video signals then can be used to provide the luminance signal in a color video monitor to control the amount of color signals appearing on the displayed picture, with the color signals being provided from storage in the foreground memory and background memory.

In the case of a motion picture, the color signals can be stored in both the foreground and background memories. By storing all action in the foreground memory and all redundant color information in the background memory, it is only necessary to apply color information into the background memory only once, and continually reuse it.

In producing color film still pictures, the black and white video monitor has the ability to combine a black and white signal with a color signal to produce a gray scale picture of each of the three colors one at a time. By placing a corresponding filter in front of the screen, a color picture can be produced.

Accordingly, it is an object of the present invention to provide improved methods and apparatus for converting black and white or monochrome pictures to multi-color pictures, retouched black and white pictures and color video tapes electronically.

Another object is to provide a method and apparatus of the above type wherein presently available equipment can be employed, with little modification required.

BRIEF DESCRIPTION OF THE DRAWINGS

Other objects and advantages of the present invention will be apparent from the description set forth below, taken in conjunction with the drawings, in which.

DESCRIPTION OF THE PREFERRED EMBODIMENT

Figure 1:
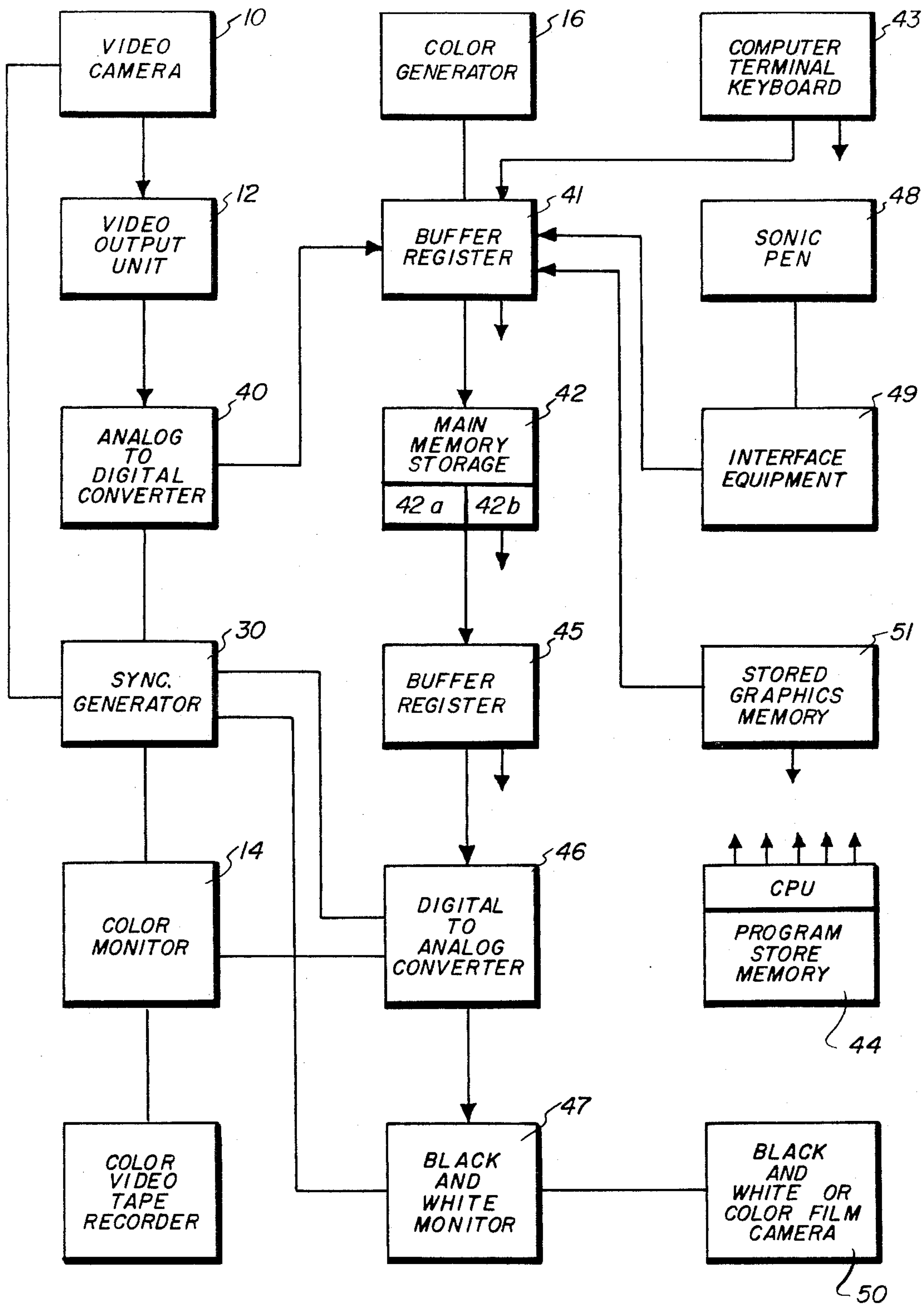
FIG. 1 is a block diagram schematic illustrating a preferred method and apparatus of the invention.

Referring now to FIG. 1 of the drawings, the apparatus for converting black and white or monochrome pictures to multicolor pictures in accordance with the method of the invention is illustrated in block diagram schematic, and can be seen to include a black and white (monochrome) video camera 10 for scanning the black and white picture to be converted to color. The video camera 10 has a scanning rate consistent with the end result desired. The 525 line scanning rate will produce satisfactory results for video tape since this is the normal mode in which it is presented. For colored film, the higher the scanning rate, the better the resolution of the resulting picture. Scanning rates for video tape of 1,000 to 2,000 lines or more are preferred. The video camera 10 in scanning the black and white picture produces output signals which vary continuously from 0 to a maximum, depending upon the point of the black and white picture that is being scanned, and these output signals are coupled to a black and white video output unit 12.

These output signals are conditioned and coupled by the video output unit 12 to an analog-to-digital converter 40. The analog-to-digital converter 40 processes the video output signals to place them in a digital format and couples them to a buffer register 41 which places them in store in a main memory 42. A computer terminal keyboard 43 and a central processing unit 44 are provided for properly addressing them into storage in the main memory 42. The main memory 42 is made up of at least two additional sections, a foreground memory 42*a* and a background memory 42*b*. This main memory storage 42, 42*a* and 42*b* may be, for example, a disc memory and system of the type manufactured and sold by Data Disc of Sunnyvale, California. As more fully explained below, the black and white digital picture information is stored in the main memory section 42 and any changes to be made by the addition of color is stored in the foreground memory 42*a* and/or the background memory 42*b*

The black and white information stored in the main memory 42 is sampled by the central processing unit 44, and the sampled information is temporarily stored in a buffer register 45 for processing by a digital-to-analog converter 46. The processed or converted picture information signals then are coupled to and displayed on a black and white monitor 47, if they are to be retouched or on a color monitor 14 if they are to be colored.

A data input device 48 which may be, for example, a graf/pen sonic digitizer of the type sold by Science Accessories Corporation, Southport, Connecticut, is used to pinpoint on the monitor 47 the location of any black and white retouching changes to be made. The data input device, hereinafter termed a sonic pen 48, determines the "*x-y*" coordinates which are translated to digital addresses by the interface equipment 49. These addresses are displayed on the control unit of the sonic digitizer or printed out on the computer terminal keyboard 43 which also has the ability to designate the areas requiring changes and to extract various sizes and shapes of information to be used in retouching the picture. As indicated above, all of these changes are coupled to the main memory section 42 and used to modify the originally stored black and white video signals.

In this way, pictures are reconstructed on the black and white monitor 47 with changes. A black and white film camera 50 then can record the picture, and produce the equivalent of a retouched picture. The video output unit 12 further has the ability to reverse a picture from positive to negative or negative to positive. This allows the advantage of starting out by taking a picture of a negative and reversing it to a positive while working on any corrections.

The above described apparatus also can be used to convert black and white motion pictures to color video motion pictures. Such conversions must be performed a frame at a time, but with the process of the present invention, the redundant operations from one frame to the next are reduced by computerizing these redundant portions. More particularly, as described above, a black and white picture is picked up by the video camera 10, coupled to and processed by the video output unit 12, the analog-to-digital convertor 40, the buffer register 41 and stored in the main memory 42. This information may be altered or may be the retouched picture information since it ultimately ends up as the luminance signal in the color monitor 14 to control the amount of color signals appearing on the displayed picture.

Color signals are generated by the color generator 16 in the form of binary bits, in a fashion such as to provide various amounts of color plus no color. This may be accomplished for example, by using a diode tree and switches to produce three binary bits for each of the colors, to produce seven levels of color signals. These binary bits are then transferred to the buffer register 41 to await an address location in the main memory 42. Locations for color to be applied are determined by placing the sonic pen 48 on the face of the monitor 48 displaying the picture to be colored at the appropriate location. The sonic pen 48 generates "x-y" coordinates that are translated to a binary address by the interface equipment 48. Prior to this information being stored in the main memory 42, any previous information in that location is erased. The information then is read and coupled into the buffer register 45, and from the latter to the digital-to-analog converter 46 and displayed on the color monitor 14. Large areas to be colored are handled by using the starting point of coloring determined by the sonic pen 48 and having an operator input a program loop into the computer terminal keyboard 43, or by having the operator input a request into the computer terminal keyboard 43 to extract a given size and shape of graphic information from a stored memory 51 that is used to color a given portion of the picture. The information from the stored graphics memory 51 is used only for addressing locations to be colored since all color signals originate at the color generator 16.

To reduce the redundant effort of coloring from one frame to the next, color signals are stored in the foreground and background memories 42*a* and 42*b* of the main memory 42. All action is stored in the foreground memory 42*a* while redundant color information is stored in the background memory 42*b*. In this way, any action stored in the foreground memory 42*a* is transferred to the buffer register 45 first. Where no information is stored in the foreground memory 42*a*, the information stored in the background memory 42*b* is used in the appropriate locations. In this manner, it is only necessary to apply color information into the background memory 42*b* only once and continually reuse it. In the case of moving titles in the foreground and scenery in the background, it is only necessary to color the titles once and reprogram their location for subsequent frames by inputing the computer terminal keyboard 43. Since the background information does not need to be changed, the average time to spend on each frame for the minor changes can be kept to a minimum. After a complete frame has been colored, the electrical signals are transferred to a color video tape recorder 52 for recording a frame at a time to produce a color video tape of a motion picture.

Using this technique, a cartoon or the like, for example, can be more practically produced by first doing them in black and white, and then coloring them electronically.

A color film still picture likewise can be made from a black and white picture. In this case also, the black and white picture is picked up by the video camera 10, coupled thru the video output unit 12 to the analog-to-digital converter 40, the buffer register 41 and stored in the main memory 42. This stored information then is read into the buffer register 45, translated by the digital-to-analog converter 46 and displayed on the black and white monitor 47.

The black and white monitor 47 has the ability to combine this black and white signal with a color signal to produce a gray scale picture of each of the three colors one at a time. For this reason, it is necessary to produce a black and white picture that is a gray scale of one of the three colors used for color monitors (red, green or blue) and place a corresponding filter in front of the screen and take a color picture of it. The same is done for the other two colors to record all three colors on the same color film, or as three separate gray scale pictures on black and white film if this is desired. The recording of all three colors on one film will produce the same results as taking a picture of a color picture on a color TV monitor. All colors blend to form a perfect picture with no appearance of blending colors. However, since the scanning rate is higher than the normal 525 lines, the quality will be considerably better than can be achieved by photographing a color TV monitor. The coloring information and the signals for applying the colors are produced as previously described above. The color monitor 14 is used to monitor the progress of coloring until it is ready to be photographed at the black and white monitor 47.

The use of scanning rates above 525 lines will produce a TV picture of greater quality and more than acceptable for normal reproduction purposes. The use of scanning rates above 525 lines, however, will dictate the need for an additional buffer register (not shown) in parallel with the buffer register 45 and an additional digital-to-analog converter (not shown) in parallel with the digital-to-analog converter 46 to scan at a rate of 525 lines to work into the color monitor 14. This allows a colored picture to be monitored on a standard color video monitor 14 while color is being added to the high resolution black and white memory for display on black and white monitor 47.

The central processing unit 44 and its associated program store memory control and coordinate almost all operations in the system. The sync generator 30 synchronizes the scanning operations of the video camera 10, the video output unit 12, the color monitor 14, the analog-to-digital converter 40, the digital-to-analog converter 46 and the black and white monitor 47. The central processing unit 44 is coupled via a data bus with the computer terminal keyboard 43, the stored graphics memory 51, the buffer registers 41 and 45 and the main memory 42.

It will thus be seen that the objects set forth above, among those made aparent from the preceding description, are efficiently attained and certain changes may be made in carrying out the above method and in the construction set forth. Accordingly, it is intended that all matter contained in the above description or shown in the accompanying drawings shall be interpreted as illustrative and not in a limiting sense.

Now that the invention has been described, what is claimed as new and desired to be secured by Letters Patent is:

1. A method of converting black and white or monochrome pictures to multi-color pictures comprising the steps of:

scanning the picture to be converted with a video camera, storing the video output signals of said video camera in memory storage means, reading said stored video output signals from said memory storage means and coupling the same to said color monitor to display a black and white image on it, selectively generating color signals in pre-established increments of color brilliancy;

addressing and storing said color signals in said memory storage means in locations that correspond to the area of said black and white image to be colored;

reading said stored color signals from said memory storage means and coupling the same to said color monitor to combine said color signals with said black and white image displayed thereon to form a color picture on said color monitor, said memory storage means comprising at least two memory storage sections, said video output signals being stored in one of said memory storage sections and said color signals being stored in the other one thereof, whereby one of said video output signals and said color signals can be changed without effecting the other.

2. The method of claim 1, further including the steps of:

scanning the picture to be converted with a video camera and coupling the output video signals to an analog-to-digital converter;

storing the digital signals in a memory storage;

reading out of said memory storage said digital signals and coupling them to a digital-to-analog converter;

the analog signals being coupled to said color monitor to provide said black and white image on said color monitor;

producing digital video color signals and storing them in locations in said memory storage corresponding to the areas of said black and white image to be colored;

reading out of said memory storage said digital video color signals and coupling them to said digital-to-analog converter;

the analog video color signals being coupled to said color monitor and combined with said black and white image displayed thereon to form a color picture on said color monitor.

3. The method of claim 2, further including the step of recording said color picture on said color monitor on color video tape.

4. The method of claim 2, wherein said memory storage comprises at least two memory storage sections, said digital video output signals being stored in one of said memory storage sections and said digital color signals being stored in other said memory sections, whereby one of said signals can be changed without effecting the other.

5. The method of claim 2, wherein the location of the color to be applied to said black and white image on said color monitor is established by data input means which generate x-y coordinates when placed on the screen of said color monitor, said x-y coordinates being translated to a binary address for addressing and storing said digital color signals in said memory storage.

6. A method of producing retouched pictures comprising the steps of:

scanning the picture to be retouched with a video camera and coupling the output video signals to an analog-to-digital converter;

storing the digital signals in a memory storage;

reading out of said memory storage said digital signals and coupling them to a digital-to-analog converter;

the analog signals being coupled to a video monitor to provide an image thereon;

producing digital video signals corresponding to changes to be made in said picture and addressing said digital video signals in memory storage means replacing the original digital video signals in locations to the areas of said image to be retouched;

using said retouched image stored in said memory storage means to control the amount of color signals to be displayed on a color monitor, reading out of said memory storage means said digital video signals and coupling them to said digital-to-analog converter;

the analog video signals being coupled to said video monitor to provide a retouched image; and photographing said retouched image.

7. Apparatus for converting black and white pictures to color pictures comprising, in combination:

a color monitor;

means for scanning said picture to be converted and for producing video output signals representative thereof;

memory storage means for storing said video output signals;

means for reading said stored video output signals from said memory storage means and coupling them to said color monitor to produce a black and white image of said picture on said color monitor;

means for generating color signals;

a second memoiy storage means;

means for addressing and storing said color signals in said second memory storage means in locations corresponding to the areas of said black and white image to be colored; and means for reading said stored color signals from said second memory storage means and for coupling said stored color signals to said color monitor to combine them with said black and white image displayed thereon to form a color picture on said color monitor.

8. Apparatus for converting black and white pictures to color pictures comprising, in combination:

a color monitor:

means for scannnng said picture to be converted and for producing video output signals representative thereof;

means for generating color signals;

memory storage means;

data input means for generating x-y coordinates when placed on the screen of said color monitor for locating the areas to which color is to be applied to said picture, means for translating said x-y coordinates to address and store said color signals in said memory storage means in locations corresponding to the areas of said black and white image to be colored; and means for reading said stored color signals from said memory storage means and for coupling said stored color signals to said color monitor to combine them with said black and white image displayed thereon to form a color picture on said color monitor.

* * * * *